(12) United States Patent
Ono

(10) Patent No.: US 9,804,449 B2
(45) Date of Patent: Oct. 31, 2017

(54) LIQUID CRYSTAL DISPLAY DEVICE

(71) Applicant: Panasonic Liquid Crystal Display Co., Ltd., Hyogo (JP)

(72) Inventor: Kikuo Ono, Ibaraki (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 14/743,334

(22) Filed: Jun. 18, 2015

(65) Prior Publication Data

US 2016/0370661 A1    Dec. 22, 2016

(51) Int. Cl.
*G02F 1/1343*    (2006.01)
*G02F 1/1368*    (2006.01)
*G02F 1/1337*    (2006.01)
*G02F 1/1335*    (2006.01)

(52) U.S. Cl.
CPC ...... *G02F 1/134309* (2013.01); *G02F 1/1368* (2013.01); *G02F 1/133514* (2013.01); *G02F 1/133707* (2013.01); *G02F 2001/134345* (2013.01)

(58) Field of Classification Search
CPC .................................................. G02F 1/134309
See application file for complete search history.

(56) References Cited

U.S. PATENT DOCUMENTS

| 2005/0237447 A1* | 10/2005 | Ono ................. G02F 1/134363 349/106 |
| 2013/0249960 A1* | 9/2013 | Yamada ............... G09G 3/344 345/690 |
| 2014/0307212 A1* | 10/2014 | Oka ................. G02F 1/134363 349/123 |

* cited by examiner

*Primary Examiner* — Edmond Lau
(74) *Attorney, Agent, or Firm* — Wenderoth, Lind & Ponack, L.L.P.

(57) ABSTRACT

A liquid crystal display device includes a lower electrode and a plurality of upper electrodes opposed to the lower electrode formed in the first substrate. At least one first upper electrode and at least one second upper electrode of the plurality of upper electrodes are formed in each of the plurality of pixels. Each of the first upper electrodes has a plurality of slits that extend in a first direction, each of the second upper electrodes has a plurality of slits that extend in a second direction which is different from the first direction, and the first and second upper electrodes are electrically isolated from each other.

15 Claims, 12 Drawing Sheets

LIQUID CRYSTAL DISPLAY DEVICE

TECHNICAL FIELD

The present disclosure relates to a liquid crystal display device and a display device thereby.

BACKGROUND

Liquid crystal displays (LCDs) include various modes. One of the LCD modes is an In-Plane Switching (IPS) mode. It is currently useable to attain a wide viewing angle. The IPS mode is a liquid crystal driving mode that rotates liquid crystal molecules in a planar direction via a horizontal (in-plane) electric field, thus rotating an effective optical axis within a plane, and controlling transmittance of the light. The use of LCDs has become widespread in various fields, such as displaying information that was previously displayed via gauges in, for example, the dashboard of a car. Thus, the LCDs should have a fast response time even at low temperatures. Recently, for example, a fast-response LCD structure in the IPS mode was proposed, as published in U.S. published application No. 2014/0307212. Such an electrode structure, however, poses a problem of low transmittance. An object of the present disclosure is to accomplish a high transmittance and fast-response characteristics at the same time.

SUMMARY

In one general aspect, a liquid crystal display device includes a first substrate, a second substrate and a liquid crystal layer interposed between the first and second substrates, a lower electrode formed in the first substrate, a plurality of upper electrodes opposed to the lower electrode and formed between the lower electrode and the liquid crystal layer and a plurality of thin film transistors each connecting to one of the plurality of upper electrodes. The first substrate, the second substrate and the liquid crystal layer form a plurality of pixels arranged in a matrix, each of the plurality of pixels including a plurality of sub-pixels. At least one first upper electrode and at least one second upper electrode of the plurality of upper electrodes are formed in each of the plurality of pixels. Each of the first upper electrodes has a plurality of slits that extend in a first direction, each of the second upper electrodes has a plurality of slits that extend in a second direction which is different from the first direction, and the first and second upper electrodes are electrically isolated from each other.

In another general aspect, a liquid crystal display device includes, a first substrate, a second substrate and a liquid crystal layer interposed between the first and second substrates, a common electrode formed in the first substrate and a plurality of pixel electrodes including first pixel electrodes and second pixel electrodes opposed to the common electrode and formed between the common electrode and the liquid crystal layer. The first substrate, the second substrate and the liquid crystal layer form a plurality of pixels arranged in a matrix, each of the pixels including at least a white sub-pixel having a non-colored color filter and a non-white sub-pixel having a colored color filter. The second pixel electrodes are located in the white sub-pixels and have a plurality of slits that extend in a first direction. The first pixel electrodes are located in the non-white sub-pixels and have a plurality of slits that extend in a second direction which is different than the first direction.

In another general aspect, a liquid crystal display device includes a first substrate, a second substrate and a liquid crystal layer interposed between the first and second substrates. The first substrate, the second substrate and the liquid crystal layer form a plurality of pixels arranged in a matrix, each of the pixels including a plurality of sub-pixels. Each of the plurality of sub-pixels includes a common electrode formed in the first substrate, a plurality of pixel electrodes includes a first pixel electrode and a second pixel electrode opposed to the common electrode and formed between the common electrode and the liquid crystal layer and a first thin film transistor and a second thin film transistor. The first pixel electrode is connected to the first thin film transistor, and the second pixel electrode is connected to the second thin film transistor. The first pixel electrode has a plurality of slits that extend in a first direction. The second pixel electrode has a plurality of slits that extend in a second direction which is different than the first direction.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features in the figures may be arbitrarily increased or reduced for clarity purposes.

DETAILED DESCRIPTION OF THE EMBODIMENTS

It is to be understood that the following disclosure provides many different embodiments, or examples, for implementing different features of the present subject matter. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

First Embodiment

Figure 1:
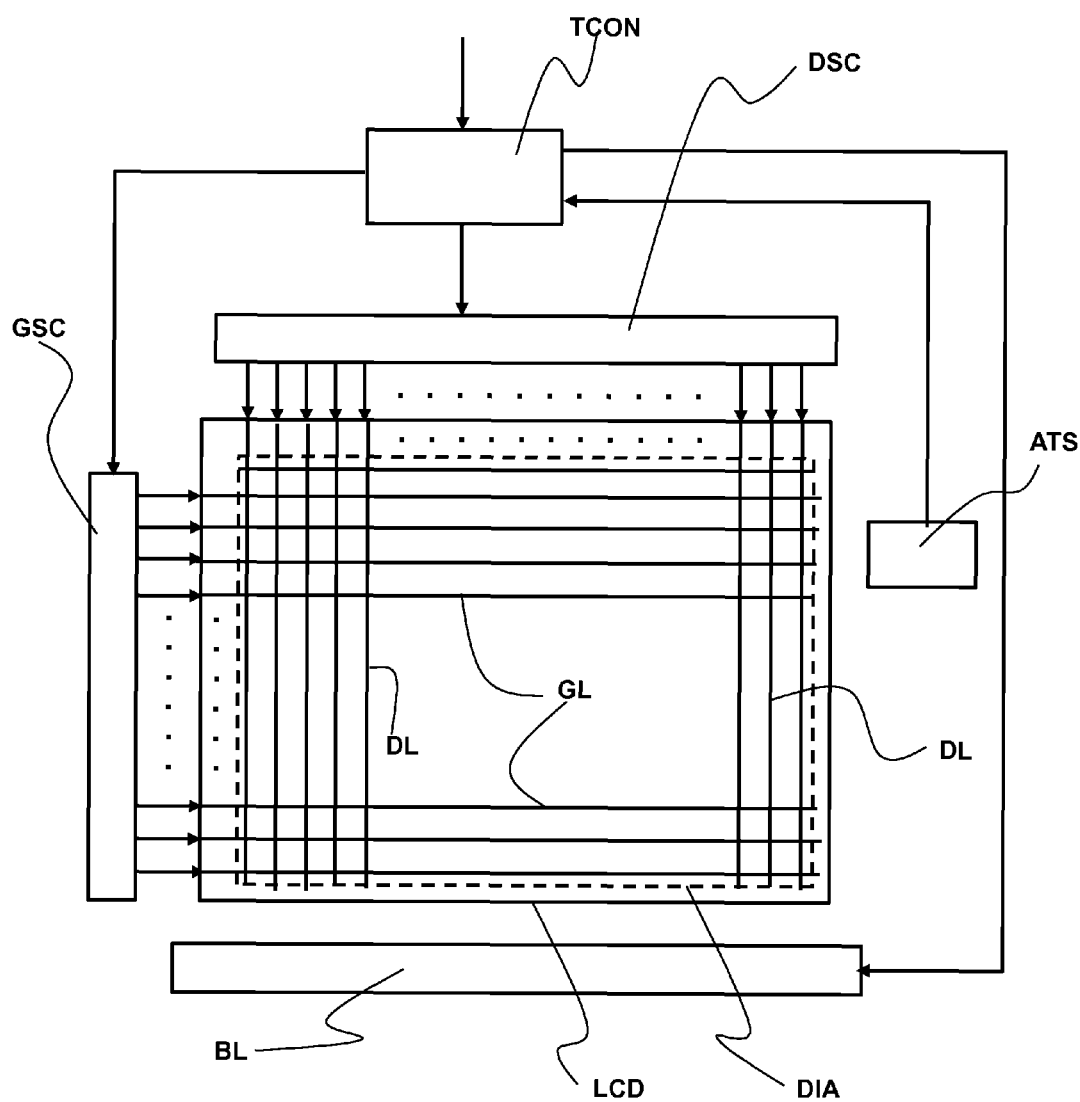
FIG. 1 is a block diagram of an example of a system configuration of a liquid crystal display device according to a first embodiment.

FIG. 1 illustrates a liquid crystal display device including a liquid crystal display LCD, a timing control circuit TCON, a gate scanning drive circuit GSC, a data signal drive circuit DSC, a backlight unit BL, and a temperature detecting sensor circuit ATS. The timing control circuit TCON receives an outside image signal and, based on the image signal, outputs a data signal and a timing signal to both the gate scanning drive circuit GSC and the data signal drive circuit DSC. In the liquid crystal display LCD, gate lines GL are scanned by the gate scanning drive circuit GSC and a data voltage based on the image signal is supplied to data lines DL from the data signal drive circuit DSC. The temperature detecting sensor circuit ATS detects an ambient temperature of the liquid crystal display LCD. The temperature information is processed by the timing control circuit TCON. The timing control circuit TCON controls the data signal drive circuit DSC to output the data voltage, based on the data signal, to the liquid crystal display LCD along with adjusting a brightness of the backlight unit BL based on the ambient temperature detected by the temperature detecting sensor circuit ATS.

Figure 2:
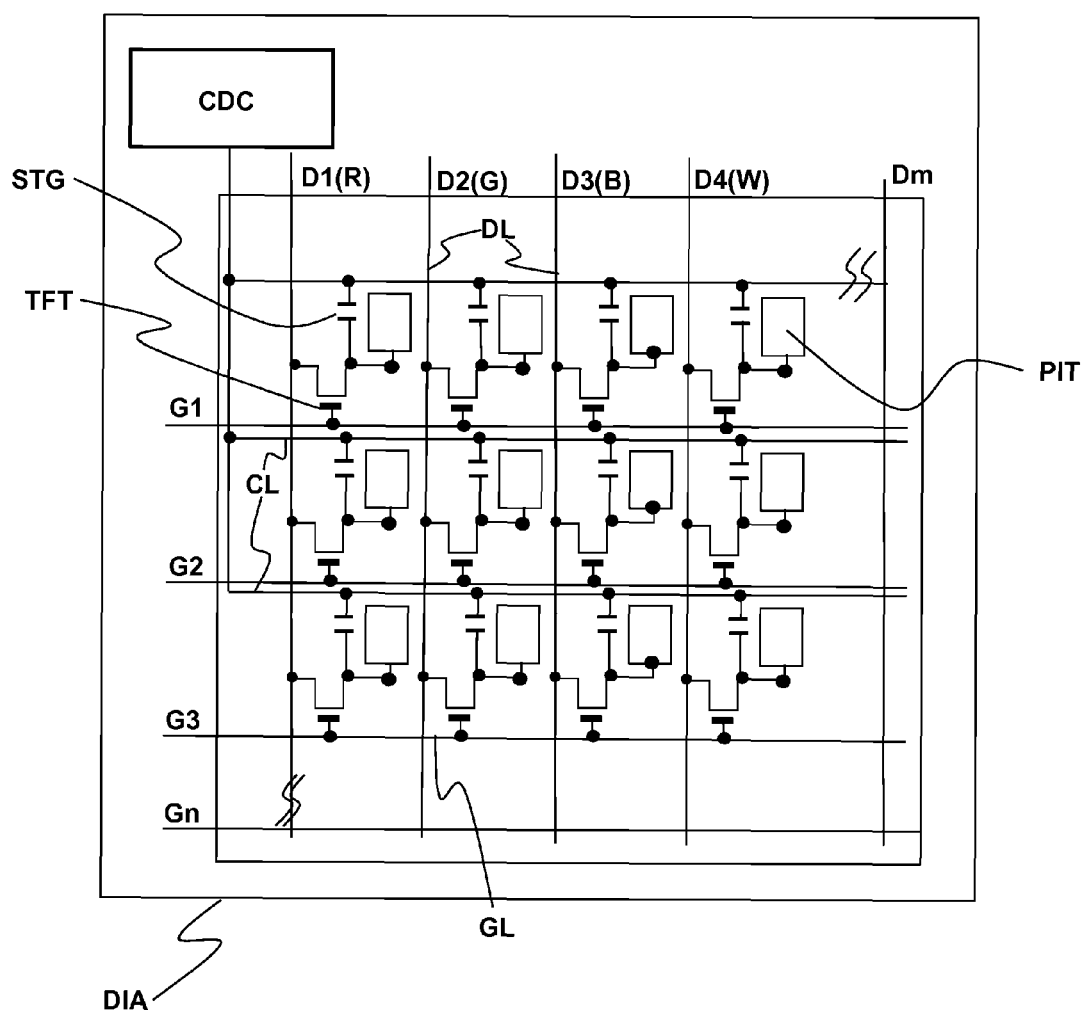
FIG. 2 is a circuit diagram of a drive circuit that drives pixels of the liquid crystal display device according to the first embodiment.

As illustrated in FIG. 2, a gate voltage is supplied from the gate scanning drive circuit GSC through gate lines G1, G2, ... and Gn and the data voltage is supplied from the data signal drive circuit DSC through data lines D1, D2, ... and Dm. Pixels are arranged in a matrix in a display area DIA. As illustrated in FIG. 2, one pixel in this embodiment includes four sub-pixels in which color filters of red (R), green (G), blue (B) and white (W) are formed, respectively. In FIG. 2, one sub-pixel is defined by two adjacent gate lines and two adjacent data lines. A thin film transistor (TFT) and a pixel electrode PIT, which is connected to the TFT, are formed in the sub-pixel. The pixel electrode PIT is constituted of a rectangular layer corresponding to each sub-pixel. A common electrode CIT is formed opposite to the pixel electrode PIT. The common electrode CIT is formed as a layer over a whole of the display area DIA. However, a common electrode CIT may be formed in each sub-pixel separately. In this case, these common electrodes CIT are connected with common lines CL.

The pixel electrode PIT and the common electrode CIT are made of a material capable of transmitting visible-light and having electrical conductivity, such as Indium-Tin-Oxide (ITO). In other words, the pixel electrode PIT and the common electrode CIT are transparent electrodes. The thin film transistor TFT is turned on and off to control the feeding of the data voltage to the pixel electrode PIT formed in the sub-pixel. Then, by an electric field between a common voltage supplied from a common electrode drive circuit CDC via a common line CL to the common electrode CIT and the data voltage supplied to the pixel electrode PIT, a liquid crystal layer LC is driven. In order to prevent a voltage drop in the liquid crystal layer LC, a retention capacitor STG is formed in each sub-pixel. When a color display is performed, it is realized by applying a data voltage to the data lines D1 (R), D2 (G), D3 (B) and D4 (W) connected to the sub-pixels of red (R), green (G), blue (B) and white (W), respectively, which are each formed with a vertical striped color filter.

Figure 3:
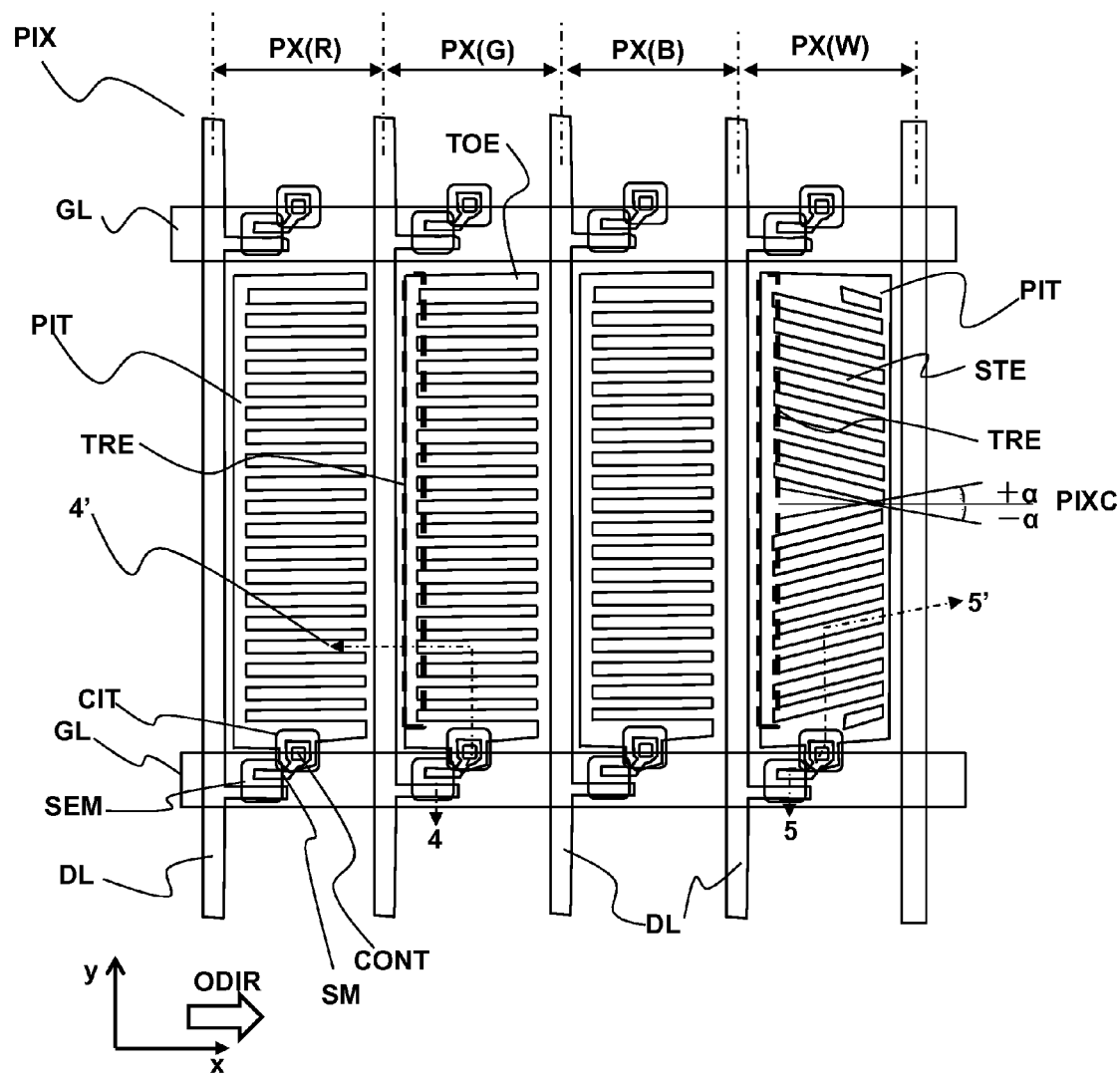
FIG. 3 is a plan view illustrating a pixel including of four sub-pixels in the liquid crystal display device according to the first embodiment.

In FIG. 3, one pixel PIX is comprised of four sub-pixels having color filters of different colors. The sub-pixels in one pixel PIX include a Red sub-pixel region PX (R) combined with a red color filter, a Green sub-pixel region PX (G) combined with a green color filter, a Blue sub-pixel region PX (B) combined with a blue color filter and a White sub-pixel region PX (W) combined with a white (non-colored) color filter. The red color filter, the green color filter and the blue color filter are colored color filters and the white color filter is non-colored color filter. One sub-pixel includes a gate line GL, a data line DL, a semiconductor layer SEM, a source electrode SM, a pixel electrode PIT and a common electrode CIT. The pixel electrode PIT is connected to the source electrode SM through a through-hole portion CONT of an insulation film.

FIG. 3 illustrates the configuration of the pixel electrodes PIT including openings (slits). A shape of the pixel electrode PIT formed in the Red sub-pixel region PX (R), the Green sub-pixel region PX (G) and the Blue sub-pixel region PX (B) is different from a shape of the pixel electrode PIT formed in the White sub-pixel region PX (W). Specifically, the pixel electrodes in all four sub-pixel regions have slits, which are rectangular shaped and include long sides and short sides. The pixel electrodes PIT in the Red sub-pixel region PX (R), the Green sub-pixel region PX (G) and the Blue sub-pixel region PX (B) are comb-shaped. A number of projecting (comb tooth) electrodes TOE extend from a body (trunk) electrode TRE. An extending direction of comb tooth electrodes TOE extends in an X-direction. An opening (slit) in the pixel electrode PIT is formed between two adjacent comb tooth electrodes TOE. As there are at least two projecting (comb tooth) electrodes TOE, there are at least two openings (slits). A shape of the openings (slits) is rectangular which is comprised of long sides and short sides. The openings (slits) extend in the X-direction, which means that the long sides of the rectangular shape of the openings (slits) run in the X-direction. Also, the openings (slits) have one end closed by the body (trunk) electrode TRE and the other end opened.

Further, an outermost shape of the pixel electrode PIT in the White sub-pixel region PX (W) is rectangular, and this pixel electrode PIT includes a plurality of openings (slits). A plurality of striped electrodes STE are connected to outermost body (trunk) electrodes TRE at both their ends. An extending direction of the striped electrodes STE is a diagonal direction with respect to the X-direction. An opening (slit) in the pixel electrode PIT is formed between two adjacent striped electrodes STE. As the striped electrodes STE are at least two, there are a plurality of openings (slits). A shape of the openings (slits) is rectangular which is comprised of long sides and short sides. The openings (slits) extend in an oblique direction with respect to the X-direction, which means that the long sides of the rectangular shape of the openings (slits) run obliquely to the X-direction. Also, the openings (slits) have both ends closed by the body (trunk) electrodes TRE and are surrounded by the pixel electrode PIT.

The liquid crystal in the liquid crystal layer LC is subjected to an alignment process of rubbing or photo-alignment in a predetermined alignment direction ODIR on alignment layers (e.g., a first alignment layer AL1 and a second alignment layer AL2) so as to have the predetermined initial alignment direction ODIR. In this embodiment, the initial alignment direction ODIR of the alignment layers AL1 and AL2 in the liquid crystal display LCD is substantially the X-direction. Therefore, the comb tooth electrodes TOE of the pixel electrode PIT of the Red sub-pixel region PX (R), the Green sub-pixel region PX (G) and the Blue sub-pixel region PX (B) extend in substantially the same direction as the initial alignment direction ODIR. On the other hand, the striped electrodes STE of the pixel electrode PIT of the White sub-pixel region PX (W) extend in an oblique direction with respect to the initial alignment direction ODIR. In other words, the openings (slits) in the pixel electrode PIT of the Red sub-pixel region PX (R), the Green sub-pixel region PX (G) and the Blue sub-pixel region PX (B) extend in substantially the same direction as the initial alignment direction ODIR. On the other hand, the openings (slits) in the pixel electrode PIT of the White sub-pixel region PX (W) extend in an oblique direction with respect to the initial alignment direction ODIR. Here, "substantially same direction" means that these two directions (i.e., the extending direction of the openings (slits) in the pixel electrode PIT and the initial alignment direction ODIR) extend with respect to each other with an angle within one degree.

The striped electrodes STE of the pixel electrode PIT in the White sub-pixel region PX (W) extend with two angles with respect to the X-direction. The pixel electrode PIT in the White sub-pixel region PX (W) has two regions that are symmetrical with respect to a central line of the sub-pixel. In one pixel region, the striped electrodes STE extend with an angle of +α degrees with respect to the central line, and in the other pixel region, the striped electrodes STE extend with angle of −α degrees with respect to the central line. Here, the angle α is greater than one degree and smaller than 45 degrees.

Figure 4:
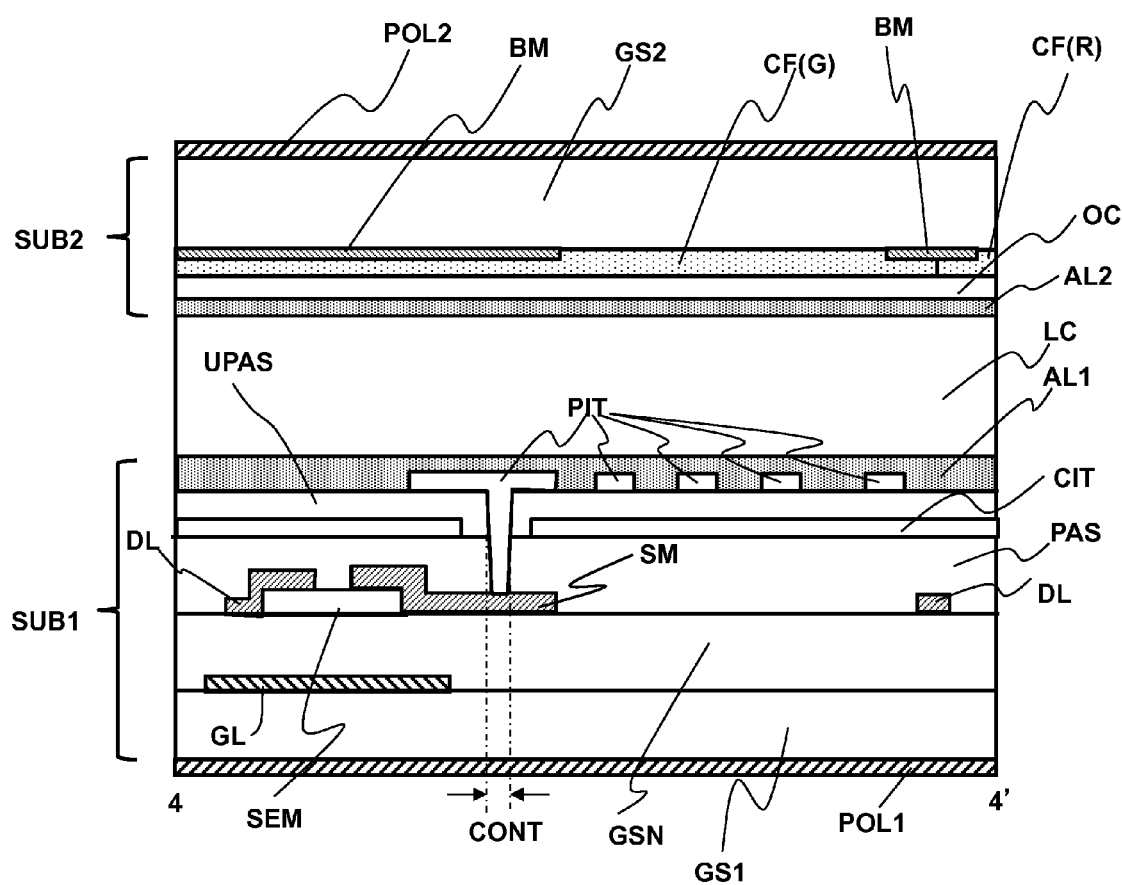
FIG. 4 is a schematic diagram of a cross-section taken along line 4-4' in FIG. 3.
Figure 5:
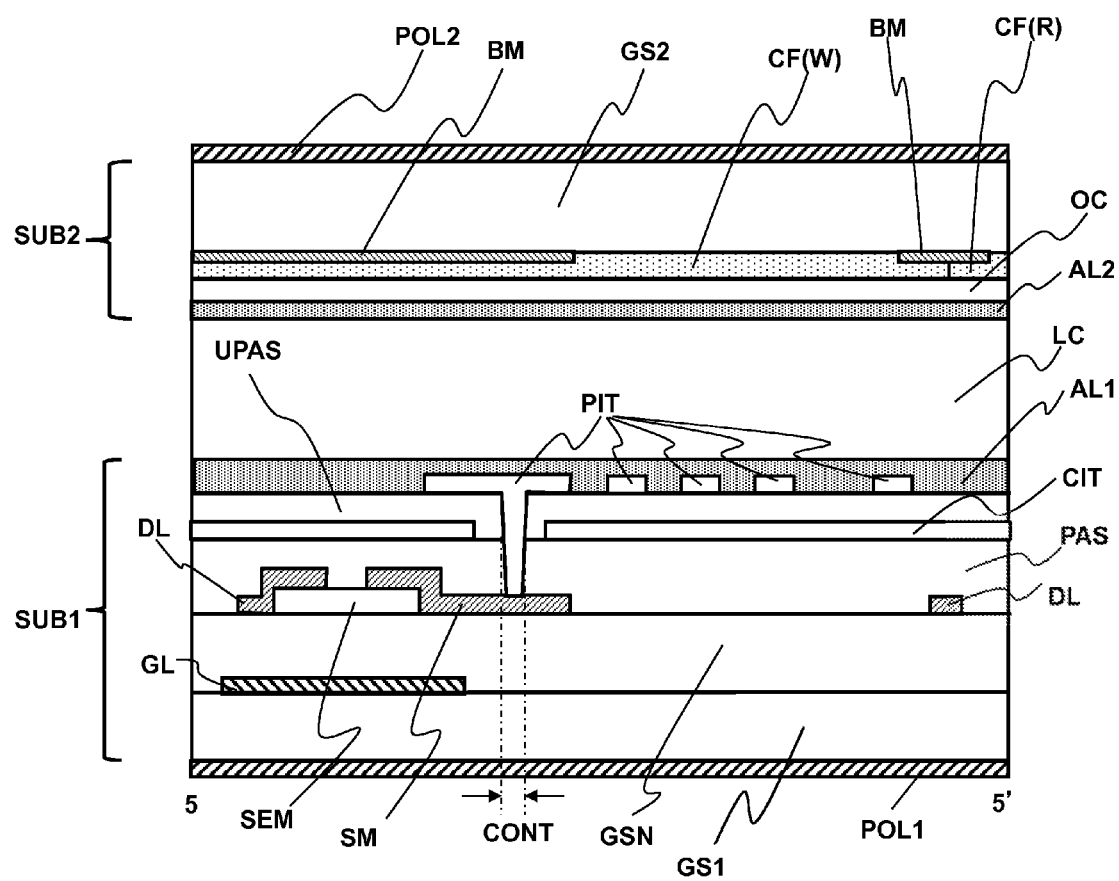
FIG. 5 is a schematic diagram of a cross-section taken along line 5-5' in FIG. 3.

FIG. 4 is a cross-section of a sub-pixel of the Green sub-pixel region PX(G). This sectional view of the Green sub-pixel region PX (G) is basically the same as that of the Red sub-pixel region PX (R) and the Blue sub-pixel region PX (B). FIG. 5 is a cross-section of a sub-pixel of the White sub-pixel region PX (W). The liquid crystal display LCD includes a TFT substrate, which is a first substrate SUB1, a color filter substrate, which is a second substrate SUB2, and a liquid crystal layer LC sandwiched and sealed therebetween. The TFT substrate SUB1 is a substrate assembly including a gate line GL, a gate insulator film GSN, a thin film transistor (TFT) including a semiconductor layer SEM, a drain electrode DL and a source electrode SM, a passivation film PAS, a common electrode CIT, an upper passive layer UPAS, a pixel electrode PIT and a first alignment layer AL1 being stacked on a first glass substrate GS1.

The gate line GL is formed of, for example, a metallic material having (1) aluminum Al, molybdenum Mo, titanium Ti or copper Cu as a main component, (2) a plurality of stacked layers each having one of the above elements as a main component, (3) an alloy in which tungsten W, magnesium Mn or the like is added to one of the above elements, or (4) a stacked metal layer formed by any combination of (1)-(3) described above. The thickness of the gate line GL is, for example, 100 to 300 nm.

On the upper portion of the gate line GL, the gate insulator film GSN is formed. As the gate insulting film GSN, for example, a silicon nitride SiN formed with a plasma chemical vapor deposition method (CVD) can be used. The gate insulator film GSN may also be formed of silicon dioxide $SiO_2$ or alumina $Al_2O_3$.

The semiconductor layer SEM is processed into, for example, the shape of an island and is arranged above the gate line GL. As the semiconductor layer material of the semiconductor layer SEM, for example, a combination of a silicon nitride SiN and amorphous silicon a-Si, a combination of silicon dioxide $SiO_2$ and an oxide semiconductor or a low-temperature poly-silicon LTPS can be used. For example, as the oxide semiconductor, an oxide of indium-gallium-zinc or the like can be used.

At the end portions of the semiconductor layer SEM, the data line DL and the source electrode SM are formed. As the data line DL and the source electrode SM, for example, as described later, a low-resistant metallic material can be used. As the metallic material, for example, a metallic material having (1) aluminum Al, molybdenum Mo, titanium Ti or copper Cu as a main component, (2) a plurality of stacked layers each having one of the above elements as a main component, (3) an alloy in which tungsten W, magnesium Mn or the like is added to one of the above elements, or (4) a stacked metal layer formed by any combination of (1)-(3) described above can be used.

On the data line DL and the source electrode SM, the passivation film PAS is formed. As the passivation film PAS, for example, a silicon nitride SiN or silicon dioxide $SiO_2$ can be used. The passivation film PAS can have a thickness of, for example, 200 to 400 nm.

As illustrated in FIGS. 4 and 5, there are overlaps of electrode portions on the opposed faces of the common electrode CIT and the pixel electrode PIT, and openings (slits) are formed in the pixel electrode PIT. The first alignment layer AL1 for aligning liquid crystal molecules LCM of the liquid crystal layer LC is formed between the liquid crystal layer LC and the electrode layer of the common electrode CIT and the pixel electrode PIT.

The pixel electrode PIT and the common electrode CIT constitute an electrode portion for forming the fringe electric field in the liquid crystal layer LC. As the configuration examples of these combinations, various combinations are possible.

The transparent pixel electrode PIT is connected to the source electrode SM. With respect to the supply of the data voltage to the transparent pixel electrode PIT, when the on-voltage is applied to the gate line GL, the resistance of the semiconductor layer SEM is lowered, and the data voltage is transmitted from the data line DL through the source electrode SM to the transparent pixel electrode PIT. By applying a voltage to the pixel electrode PIT, a predetermined potential difference corresponding to the modulation of transmittance of the liquid crystal of a pixel PIX is imparted between the pixel electrode PIT and the common electrode CIT. The fringe electric field is generated in the vicinity of the openings in the pixel electrode PIT in the liquid crystal layer LC by the potential difference, so that an alignment state of the liquid crystal molecules LCM is controlled so as to rotate the liquid crystal molecules LCM in the substrate in-plane direction (i.e., X, Y directions).

On the other hand, the second substrate SUB2 is a substrate assembly including a black matrix BM, a color filter CF, an overcoat layer OC and a second alignment layer AL2 stacked on a second glass substrate GS2. The data line DL, the gate line GL and the thin film transistor TFT are covered by the black matrix BM having a light shielding effect from the upper surface. In this embodiment, there are four color filters formed on the second glass substrate GS2. The Red sub-pixel region PX (R), the Green sub-pixel region PX (G), the Blue sub-pixel region PX (B) have red, green and blue colored color filters, respectively. The White sub-pixel region PX (W) includes a non-colored color filter. Therefore, when white LEDs are used as the backlight unit BL, white light from the backlight unit BL can transmit through the White sub-pixel region PX (W) without attenuation. Thus, high luminescence can be realized. Also, the non-colored color filter can be omitted and the overcoat layer OC can be substituted without any color filter.

The liquid crystal layer LC is interposed between the first substrate SUB1 and the second substrate SUB2. A first polarization plate POL1 and a second polarization plate POL2 are adhered to the outside of the first glass substrate GS1 and the second glass substrate GS2, respectively. Hence, light from a backlight BL outside the first polarization plate POL1 is polarized. The polarized light is thereafter passed through the liquid crystal LC and the light is formed into oval polarized light by the optical birefringence effect of the liquid crystal layer LC. Thereafter, when the light passes through the second polarization plate POL2 on the outside of the second glass substrate GS2, the light passes through it as linear polarized light.

In the present embodiment, for example, the first polarization plate POL1 and the second polarization plate POL2 are positioned such that their polarizing axes are perpendicular to each other (so-called crossed nicols). Hence, when the liquid crystal LC is not in an electric field, even if the light of the backlight BL passes through the liquid crystal layer LC, the second polarization plate POL2 interrupts the light, and thus, it is possible to produce a black display. When a voltage is mainly applied between the transparent pixel electrode PIT and the transparent common electrode CIT to apply an electric field to the liquid crystal layer LC, the liquid crystal layer LC converts the light into oval polarized light by a birefringence operation, and thus, it is possible to change its transmittance according to its drive voltage, with the result that it is possible to produce a white display with a gray-scale.

Figure 6A:
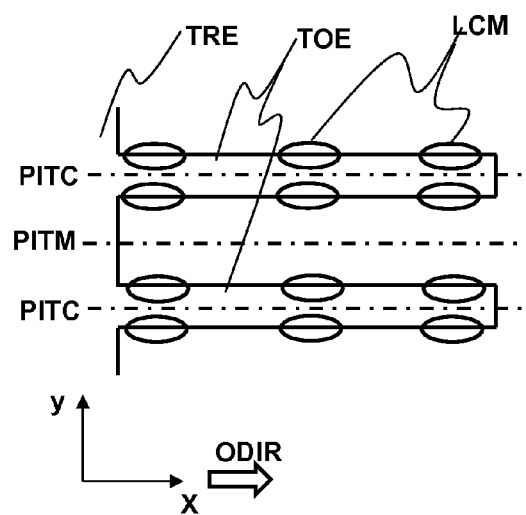
FIG. 6A is a diagram illustrating an alignment of liquid crystal molecules in a green sub-pixel region when a voltage for forming an electric field is not applied between a pixel electrode and a common electrode in the liquid crystal display device according to the first embodiment.
Figure 6B:
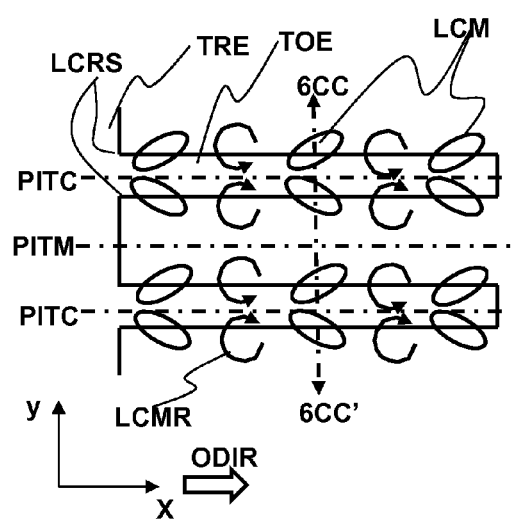
FIG. 6B is a diagram illustrating an alignment of the liquid crystal molecules in the green sub-pixel region when the voltage for forming an electric field is applied between the pixel electrode and the common electrode in the liquid crystal display device according to the first embodiment.

FIGS. 6A and 6B are plan views illustrating movement of the liquid crystal molecules LCM in the Green sub-pixel region PX (G). The liquid crystal molecules LCM in the Red sub-pixel region PX (R) and the Blue sub-pixel region PX (B) move in a similar manner. FIG. 6A shows a part of the comb-shaped pixel electrode PIT shown in FIG. 3. On the alignment layers AL1 and AL2, an alignment process is conducted in the initial alignment direction ODIR by rubbing or photo alignment. In this embodiment, as the liquid crystal has positive dielectric constant anisotropy, when the voltage for forming an electric field is applied between the pixel electrode PIT and the common electrode CIT in the liquid crystal display device, the liquid crystal molecules LCM are arranged with their long axis aligning in a direction of the generated electric field.

The comb tooth electrodes TOE of the pixel electrode PIT extend substantially parallel with the initial alignment direction ODIR. When the voltage for forming an electric field is applied between the pixel electrode PIT and the common electrode CIT, the liquid crystal molecules LCM are rotated in a clockwise direction and in a counterclockwise direction according to the liquid crystal rotation direction LCMR shown in FIG. 6B.

When the initial alignment direction ODIR is set so that an electric field direction between the pixel electrode PIT and the common electrode CIT is generated at a right angle to an extending direction of the comb tooth electrodes TOE shown in FIG. 6A, in the case where the liquid crystal has the positive dielectric constant anisotropy, the liquid crystal rotation direction LCMR of the liquid crystal molecules LCM cannot be predetermined to be in a clockwise direction or a counterclockwise direction.

On the other hand, generally speaking, when the extending direction of the comb tooth electrodes TOE of the pixel electrode PIT is designed to have more than a one degree of difference with respect to the initial alignment direction ODIR, a rotation direction of the liquid crystal molecules LCM can be determined.

In this embodiment, the comb tooth electrodes TOE of the pixel electrode PIT are designed to extend in substantially the same direction as (in other words, to extend to have an angle of less than one degree of difference with respect to) the initial alignment direction ODIR. Thus, a rotation direction of liquid crystal molecules LCM is not predetermined.

However, a liquid crystal rotation starting part LCRS, which is a start point of rotating the liquid crystal molecules LCM, is formed in a part of the trunk electrode TRE which connects to the comb tooth electrodes TOE of the pixel electrode PIT.

Because a generated direction of an electric field between the pixel electrode PIT and the common electrode CIT is not at a right angle with respect to the initial alignment direction ODIR at the liquid crystal rotation starting part LCRS, the liquid crystal molecules LCM start rotating there. The liquid crystal rotation starting part LCRS triggers the liquid crystal molecules LCM to rotate and affects the rotation of the liquid crystal molecules LCM on other parts to an end of the comb-tooth electrode TOE of the pixel electrode PIT.

The liquid crystal rotation direction LCMR of the liquid crystal molecules LCM is determined to be opposite at two adjacent ends of each of the comb tooth electrodes TOE of the pixel electrode PIT.

Figure 6C:
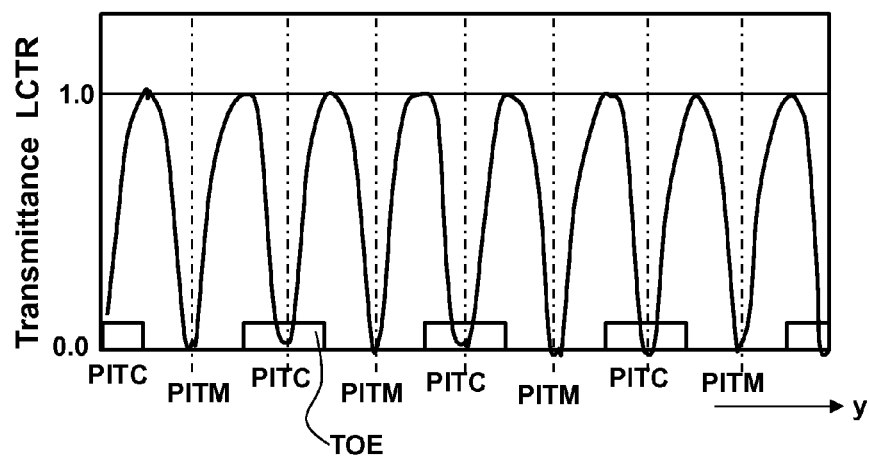
FIG. 6C illustrates a distribution of transmittance in a cross-section taken along line 6CC-6CC' in FIG. 6B.

FIG. 6C illustrates a transmittance LCTR distribution in a cross-section taken along cutting line 6CC-6CC' in FIG. 6B that cuts the comb tooth electrodes TOE of the pixel electrode PIT in the Green sub-pixel region PX (G), when the voltage for forming an electric field is applied between the pixel electrode PIT and the common electrode CIT. The transmittance becomes maximized at the ends of the comb tooth electrodes TOE of the pixel electrode PIT. The transmittance becomes minimized at a central line PITM in the width direction of slits between adjacent comb tooth electrodes TOE and at a central line PITC in the width direction of the comb tooth electrodes TOE of the pixel electrode PIT. In a whole sub-pixel, the maximum and minimum transmittance repeat in distribution. This is because, as illustrated in FIG. 6B, the liquid crystal molecules LCM rotate in opposite directions at adjacent ends of the comb tooth electrodes TOE of the pixel electrode PIT. It is noted that the transmittance LCTR distribution taken along a similar cross-section in the Red sub-pixel region PX (R) and the Blue sub-pixel region PX (B) would be substantially the same.

Figure 7A:
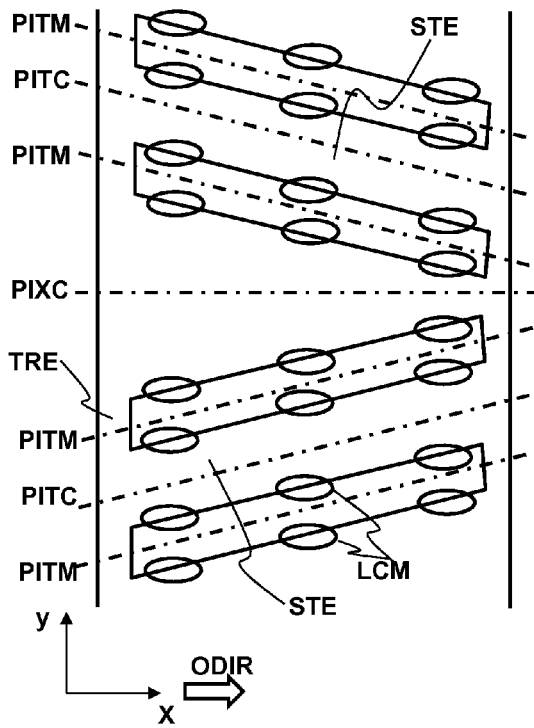
FIG. 7A is a diagram illustrating an alignment of liquid crystal molecules in the white sub-pixel region when a voltage for forming an electric field is not applied between a pixel electrode and a common electrode in the liquid crystal display device according to the first embodiment.
Figure 7B:
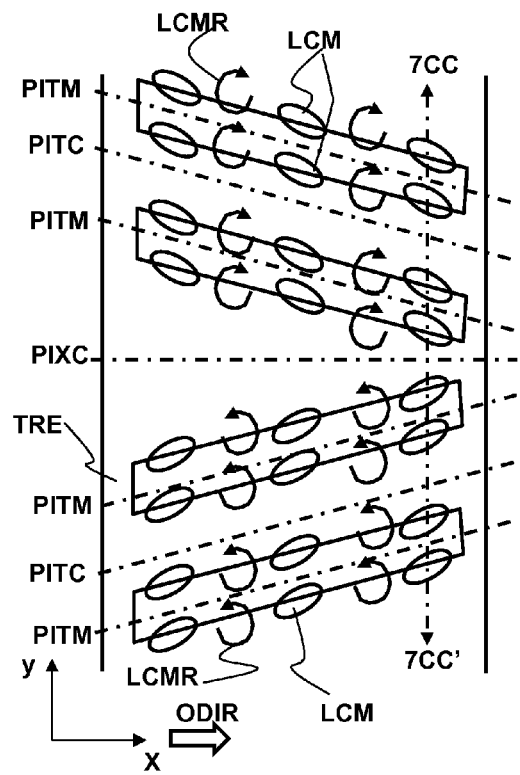
FIG. 7B is a diagram illustrating an alignment of the liquid crystal molecules in the white sub-pixel region when the voltage for forming an electric field is applied between the pixel electrode and the common electrode in the liquid crystal display device according to the first embodiment.

As illustrated in FIG. 3, the striped electrodes STE of the pixel electrode PIT in FIGS. 7A and 7B extend obliquely with an angle +α and an angle −α with respect to the initial alignment direction ODIR on the alignment layers AL1 and AL2 in an upper region and a lower region from a central line PIXC of a sub-pixel, respectively. Here, the angle α is greater than one degree.

As shown in FIG. 7A, a long axis of the liquid crystal molecules LCM is arranged along the initial alignment direction ODIR on the alignment layers AL1 and AL2. As shown in FIG. 7B, when the voltage for forming an electric field is applied between the pixel electrode PIT and the common electrode CIT, the White sub-pixel region PX (W) is divided into two regions where the liquid crystal molecules LCM are rotated in a clockwise direction and in a counterclockwise direction, respectively.

Figure 7C:
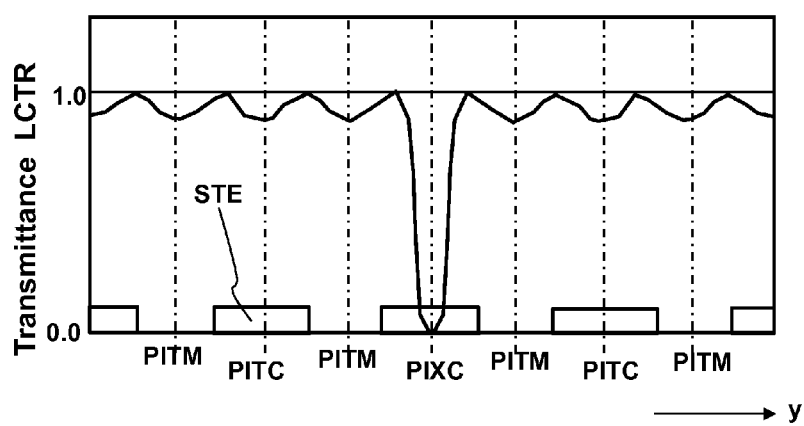
FIG. 7C illustrates a distribution of transmittance in a cross-section taken along line 7CC-7CC' in FIG. 7B.

As shown in FIG. 7C, transmittance LCTR on the central line PIXC of the White sub-pixel region PX (W) is minimized, because it is an inversed area where the rotation direction of the liquid crystal molecules LCM is changed. In regions other than the inversed area around the central line PIXC, transmittance declines little, because a rotation direction is the same at a central line PITM in the width direction of the slits between two adjacent striped electrodes STE of the pixel electrode PET and at a central line PITC in the width direction of the striped electrode STE of the pixel electrode PIT.

Therefore, transmittance in the White sub-pixel region PX (W) is about 30% higher than that in the Red sub-pixel region PX (R), Green sub-pixel region PX (G) and Blue sub-pixel region PX (B) without considering the effect of color filters.

Furthermore, transmittance of the non-colored color filter CF (W) in the White sub-pixel region PX (W) is approximately 30% higher than any one of the colored color filters CF in the Red sub-pixel region PX (R), the Green sub-pixel region PX (G) and the Blue sub-pixel region PX (B), because the non-colored color filter CF (W) in the White sub-pixel region PX (W) does not include pigment.

Thus, as a whole, the White sub-pixel region PX (W) can achieve nearly twice the luminescence of any one of the Red sub-pixel region PX (R), the Green sub-pixel region PX (G) and the Blue sub-pixel region PX (B).

When an image signal of a maximum in gray scale is applied to each of the Red sub-pixel region PX (R), the Green sub-pixel region PX (G), the Blue sub-pixel region PX (B) and the White sub-pixel region PX (W), a response speed of the liquid crystal molecules LCM depending on an ambient temperature in the Red sub-pixel region PX(R), the Green sub-pixel region PX(G) and the Blue sub-pixel region PX (B) is compared with that in the White sub-pixel region PX (W).

The response speed of the liquid crystal molecules LCM in the Red sub-pixel region PX(R), the Green sub-pixel region PX(G) and the Blue sub-pixel region PX (B) can be, for example, two times faster than that in the White sub-pixel region PX (W) depending on the ambient temperature. A difference in the response speed of the liquid crystal molecules LCM between, for example, the Green sub-pixel region PX (G) and the White sub-pixel region PX (W) is particularly remarkable at a temperature lower than 0° C.

Therefore, the Red sub-pixel region PX (R), the Green sub-pixel region PX (G) and the Blue sub-pixel region PX (B) of the liquid crystal display LCD can display a high quality moving picture even at an extremely low temperature of −30° C., for example.

On the other hand, a moving picture displayed in the White sub-pixel region is blurred or trails at a low temperature of, for example, −30° C., when the White sub-pixel region PX (W) is activated.

Thus, the liquid crystal display LCD according to this embodiment changes how it displays an image based on the ambient temperature detected by the temperature detecting sensor circuit ATS. For example, when the temperature detecting sensor circuit ATS detects that the ambient temperature is lower than a predetermined temperature, the timing control circuit TCON performs control such that an image is displayed with only the Red sub-pixel region PX (R), the Green sub-pixel region PX (G), and the Blue sub-pixel region PX (B) based on an input image signal. Further, when the ambient temperature is lower than the predetermined temperature, the timing control circuit TCON performs control such that a predetermined voltage is applied to the pixel electrode PET in the White sub-pixel region PX (W) so that it displays a specific image, for example, a black image, irrespective of an input image signal corresponding to the White sub-pixel region PX (W). As for the predetermined temperature, it can be any temperature below which the difference between the response speed of the liquid crystal molecules LCM of the White sub-pixel region PX (W) and the response speeds of the liquid crystal molecules LCM of the Red sub-pixel region PX (R), the Green sub-pixel region PX (G) and the Blue sub-pixel region PX (B) is noticeable. For example, the predetermined temperature could be 0° C. to −10° C. in this embodiment.

Furthermore, by feedback from the temperature detecting sensor circuit ATS, when the temperature detecting sensor circuit ATS detects that the ambient temperature is lower than the predetermined temperature, the timing control circuit TCON may increase a current value of the LEDs in the backlight unit BL to enhance luminescence.

On the other hand, although a blurred moving picture due to the slow response speed of the liquid crystal molecules LCM in the White sub-pixel region PX (W) at a low temperature is remarkable, it is unlikely to be noticeable at a temperature equal to or higher than the predetermined temperature, because the difference between the response speed of the liquid crystal molecules LCM of the White sub-pixel region PX (W) and the response speeds of the liquid crystal molecules LCM of the Red sub-pixel region PX (R), the Green sub-pixel region PX (G) and the Blue sub-pixel region PX (B) becomes too small.

Figure 8:
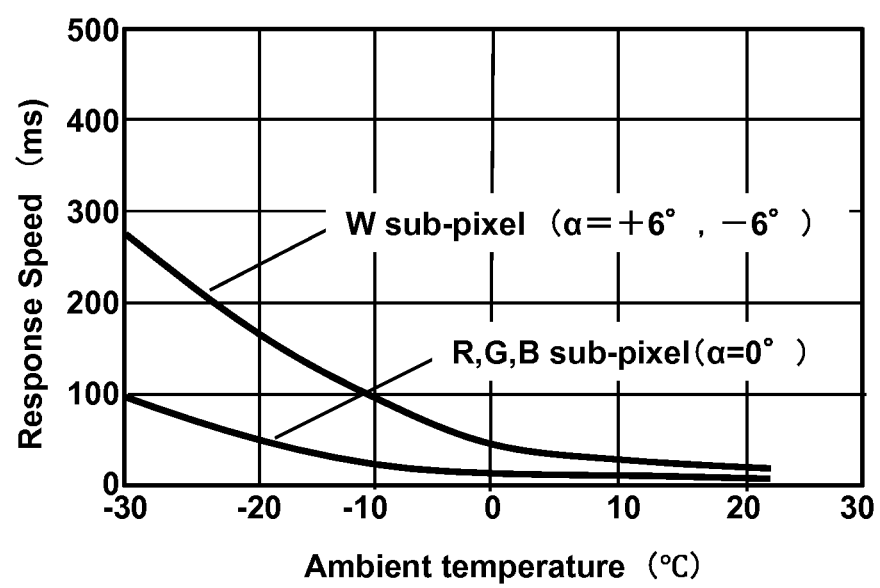
FIG. 8 is a diagram illustrating a relationship of response time of liquid crystal depending on ambient temperatures.

In FIG. 8, although the response speeds of the liquid crystal molecules LCM in the Red sub-pixel region PX (R), the Green sub-pixel region PX (G) and the Blue sub-pixel region PX (B) are faster than that in the White sub-pixel region PX (W) at a temperature of 0° C., a difference in the response speeds is difficult to notice, because the absolute value of the difference becomes less than 50 ms.

Therefore, at a temperature equal to or higher than the predetermined temperature, the White sub-pixel region PX (W) is activated to display an image based on an input image signal in addition to the Red sub-pixel region PX (R), the Green sub-pixel region PX (G) and the Blue sub-pixel region PX (B).

As described above, the White sub-pixel region PX (W) can help to decrease power consumption and increase luminescence of the liquid crystal display LCD, because the White sub-pixel region PX (W) has approximately 2 times higher transmittance than the other sub-pixel regions.

In this embodiment, the timing control circuit TCON controls the data signal drive DSC circuit to adjust a data signal based on the feedback from the temperature detecting sensor circuit ATS illustrated in FIG. 1, and controls the Red sub-pixel region PX (R), the Green sub-pixel region PX (G), the Blue sub-pixel region PX (B) and the White sub-pixel region PX (W) independently.

In this manner, at a temperature lower than the predetermined temperature, the White sub-pixel region PX (W) is not activated, which prevents a moving picture from blurring. On the other hand, at a temperature equal to or higher than the predetermined temperature, a liquid crystal display LCD with high luminescence and low power consumption can be achieved by activating the White sub-pixel region PX (W).

Furthermore, the timing controller circuit TCON controls the backlight unit BL by the feedback from the temperature detecting sensor circuit ATS, and the backlight unit BL is used to prevent luminescence from declining due to the deactivation of the White sub-pixel region PX (W) by increasing a current level of the LEDs and luminescence of the backlight unit BL.

In a sub-pixel that can realize a high speed response, like the Red sub-pixel region PX (R), Green sub-pixel region PX (G) and Blue sub-pixel region PX (B) according to this embodiment, the comb tooth electrodes TOE of the pixel electrode PET extend in a substantially same direction as (i.e., extend at an angle of from +1 degree to −1 degree with) the initial alignment direction ODIR on the alignment layers AL1 and AL2.

On the other hand, in a sub-pixel which can realize a high luminescence, like the White sub-pixel region PX (W) according to this embodiment, the striped electrodes STE of the pixel electrode PIT extend at an angle of more than +1 degree or less than −1 degree with respect to the initial alignment direction ODIR on the alignment layers AL1 and AL2 (e.g., the angle is designed to be +6 degrees and −6 degrees in this embodiment).

A reason why the fast response can be achieved in the Red sub-pixel region PX (R), Green sub-pixel region PX (G) and Blue sub-pixel region PX (B) is because the liquid crystal molecules LCM rotate along their rotation direction at a rapid rate at the ends of the comb tooth electrodes TOE of the pixel electrodes PIT as illustrated in FIG. 6B. This is because the configuration of the comb tooth electrodes TOE with respect to the liquid crystal molecules LCM creates a large torque to rotate the liquid crystal molecules LCM, when the liquid crystal molecules LCM are assumed as elastic bodies.

Therefore, a gap between two adjacent comb tooth electrodes TOE is, for example, designed to be less than 10 µm, and a number of regions where the rotation direction of the liquid crystal molecules LCM are reversed is four or more than four. In other words, the pixel electrode PIT has at least two comb tooth electrodes TOE.

As illustrated in FIG. 7B, in the White sub-pixel PX(W), which can realize a high luminescence, a response speed is slow because a rotation direction of the liquid crystal molecules LCM is reversed only around the central line PIXC of the White sub-pixel PX(W), and a width of a region where liquid crystal molecules LCM rotate in a same direction is greater than 10 µm.

In this embodiment, one implementation has been explained with liquid crystal of positive dielectric constant anisotropy where the long axis of the liquid crystal molecules LCM is arranged in a generated direction of an electric field between the pixel electrode PIT and the common electrode CIT.

However, the same effect of this implementation can be achieved with liquid crystal of negative dielectric constant anisotropy where the long axis of the liquid crystal molecules LCM is arranged at a right angle to the generated direction of an electric field between the pixel electrode PIT and the common electrode CIT.

In this case, the initial alignment direction ODIR on the alignment layers AL1 and AL2 illustrated in FIG. 3, FIGS. 6A-6C and FIGS. 7A-7C should be designed to be at a right angle with an electric field direction, namely the Y-direction. In that case, it is not necessary to change a pattern of the pixel electrode PIT or the common electrode CIT.

Further, it is noted that the discussion of this embodiment indicates that each of the pixels includes the Red sub-pixel region PX (R), the Green sub-pixel region PX (G) and the Blue sub-pixel region PX (B) along with the White sub-pixel region PX (W). However, the pixels are not limited to include four sub-pixel regions. For example, each of the pixels can include two sub-pixel regions. Thus, each of the pixels can include the White sub-pixel region PX (W) and any one of the Red sub-pixel region PX (R), the Green sub-pixel region PX (G) and the Blue sub-pixel region PX (B). As another example, each of the pixels can include three sub-pixel regions. Thus, each of the pixels can include the White sub-pixel region PX (W) and any two of the Red sub-pixel region PX (R), the Green sub-pixel region PX (G) and the Blue sub-pixel region PX (B). Also, other configurations are possible.

Second Embodiment

The block diagram of an example of the system configuration of a liquid crystal display device according to the second embodiment is the same as that in the first embodiment.

Figure 9:
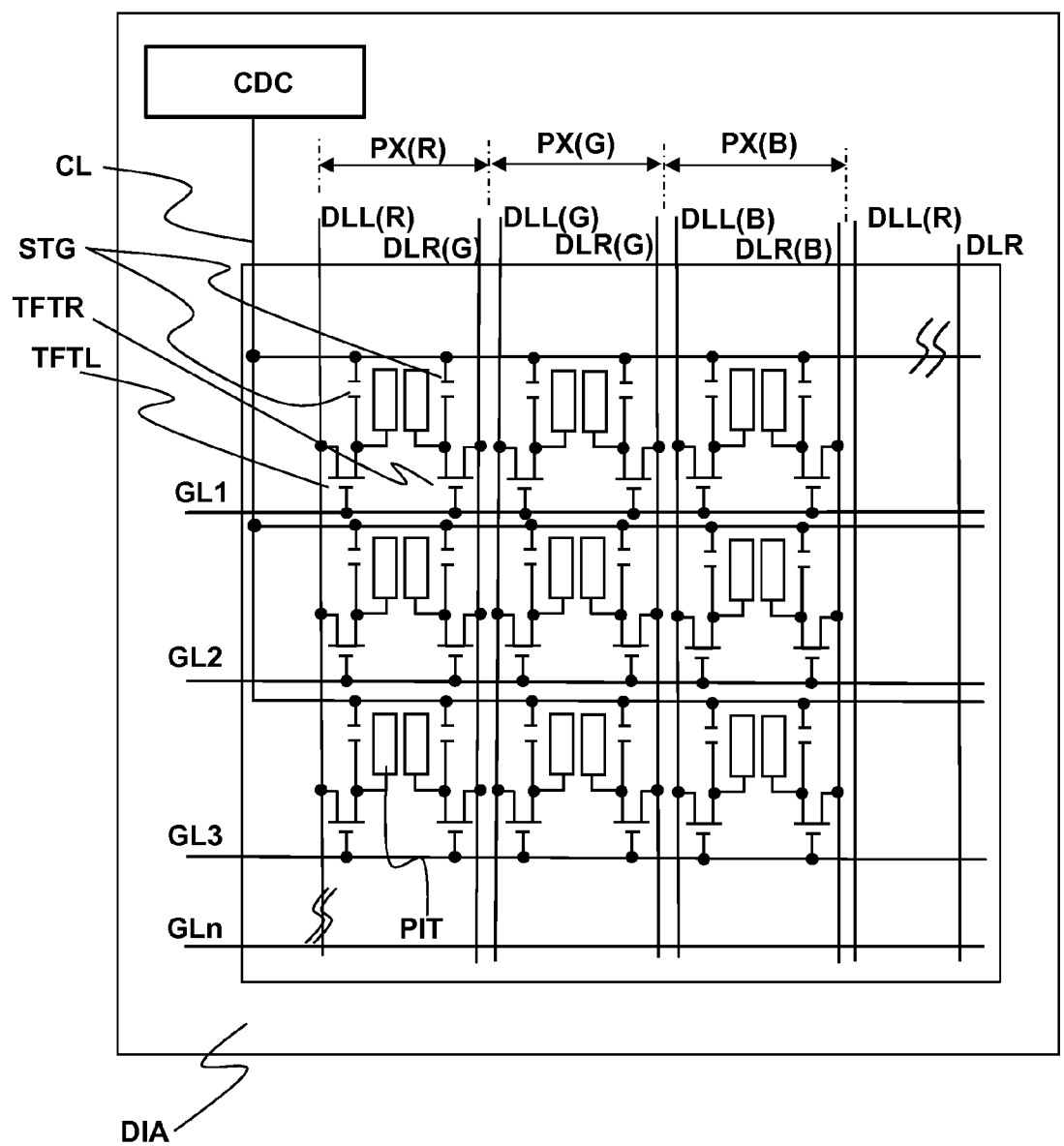
FIG. 9 is a circuit diagram of a drive circuit that drives pixels of a liquid crystal display device according to a second embodiment.

FIG. 9 is a circuit diagram of a drive circuit that drives pixels of a liquid crystal display device according to this embodiment. The temperature detecting sensor circuit ATS detects the ambient temperature of the liquid crystal display LCD. The timing control circuit TCON controls the gate scanning drive circuit GSC, the data signal drive circuit DSC and the backlight unit BL based on the detected ambient temperature. A common electrode drive circuit CDC supplies a common voltage to the common electrode CIT via a common line CL.

Figure 10:
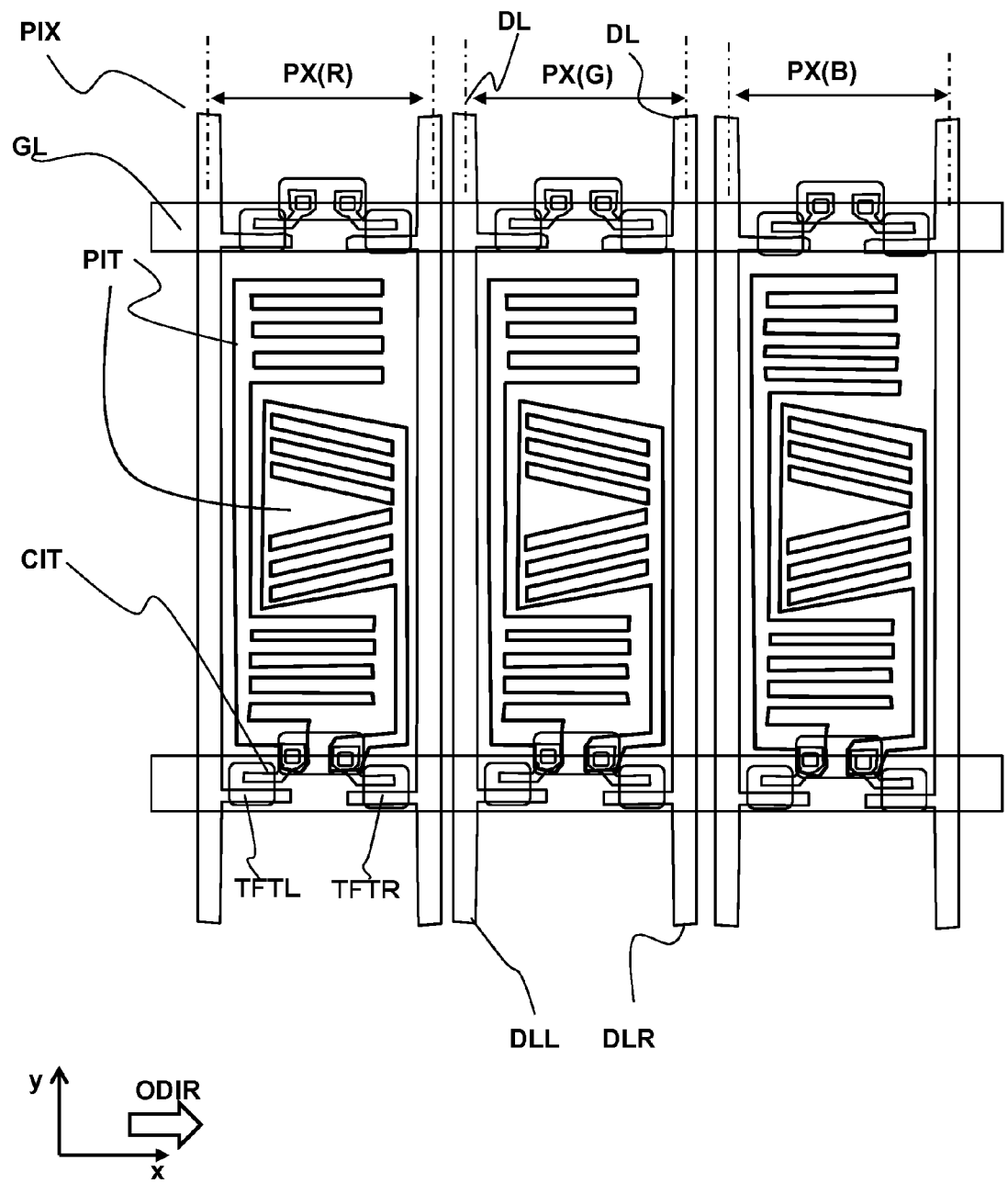
FIG. 10 is a plan view illustrating a pixel of the liquid crystal display device according to the second embodiment.

FIG. 10 is a plan view illustrating a pixel PIX of the liquid crystal display LCD device. As illustrated in FIG. 10, one pixel PIX in this embodiment includes, for example, three sub-pixels in which color filters of red (R), green (G) and blue (B) are formed, respectively. In each sub-pixel, a first data line DLL, a second data line DLR, a first thin film transistor TFTL, which connects to the respective first data line DLL, and a second thin film transistor TFTR, which connects to the respective second data line DLR, are formed. Further, although schematic diagrams of cross-sections of FIG. 10 are not provided, such cross-sections are similar to those illustrated in FIGS. 4 and 5 with respect to the presence of the various layers.

When on-voltage is applied to a gate line GL, the first thin film transistor TFTL and the second thin film transistor TFTR in a sub-pixel are turned on at a same time, and two kinds of data voltage are supplied to two pixel electrodes PIT of two pixel regions in one sub-pixel.

In this embodiment, two pixel regions where a movement of the liquid crystal molecules LCM is different from each other are formed in each sub-pixel region, according to different structures of the pixel electrodes PIT. Data voltages are supplied to the two pixel electrodes PIT in these two pixel regions through the first thin film transistor TFTL and the second thin film transistor TFTR from the first data line DLL and the second data line DLR, respectively. The liquid crystal molecules LCM are driven by an electric field generated by a difference in a voltage between the pixel electrode PIT and the common electrode CIT.

Figure 11:
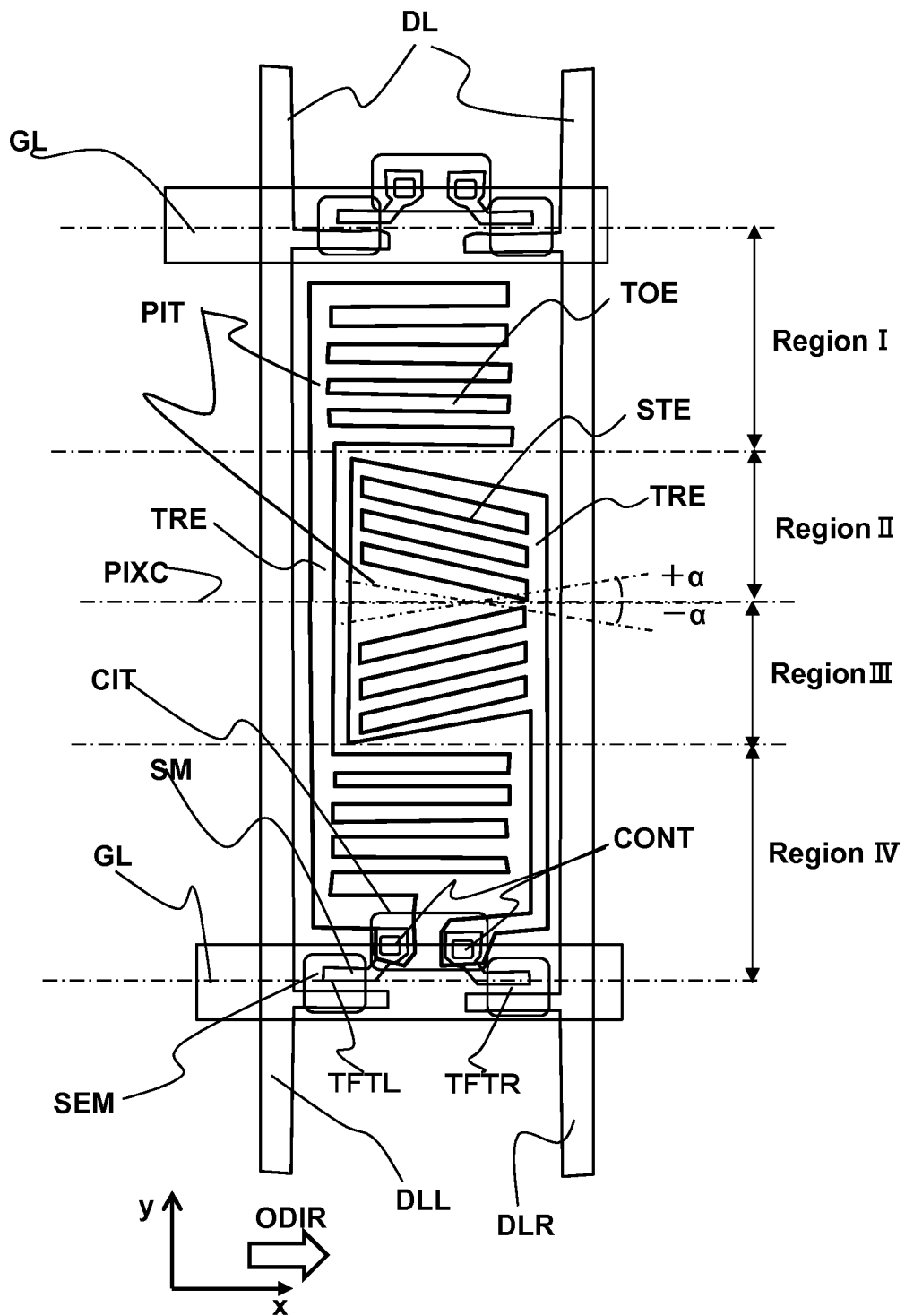
FIG. 11 is a plan view illustrating a sub-pixel of the liquid crystal display device according to the second embodiment.

As illustrated in FIG. 11, one sub-pixel region is divided into four regions I to IV. The pixel electrode PIT in regions I and IV is supplied a data signal from the first date line DLL based on an image signal by turning on the first thin film transistor TFTL on a gate line GL. In this manner, an electric field between the pixel electrode PIT and the common electrode CIT makes the liquid crystal molecules LCM rotate. In these regions, the comb tooth electrodes TOE of the pixel electrode PIT extend in an X-direction.

In this embodiment, where liquid crystal of positive dielectric constant anisotropy is used, the initial alignment direction ODIR on the alignment layers AL1 and AL2 is substantially the same as an extending direction of comb tooth electrodes TOE of the pixel electrode PIT in regions I and IV. In other words, an opening (slit) between two adjacent comb tooth electrodes TOE extends in the X-direction, which means that the long sides of the rectangular shape of the opening (slit) run in the X-direction. The opening (slit) has one end closed by the body (trunk) electrode TRE and the other end opened.

Similar to FIG. 6B in the first embodiment, a rotation direction LCMR of the liquid crystal molecules LCM reverses over every other end of the comb tooth electrodes TOE of the pixel electrode PIT. Therefore, even at a low temperature, a response speed of rotating the liquid crystal molecules LCM is fast, and high quality and little blurred moving images can be displayed. On the other hand, transmittance in regions I and IV is low because the rotation direction reverses at every other end of the comb tooth electrodes TOE of the pixel electrode PIT.

A voltage from the second data line DLR is supplied to the pixel electrode PIT in regions II and III by turning on the second thin film transistor TFTR on a gate line GL. Striped electrodes STE of the pixel electrode PIT in these regions extend with an angle α of greater than 1 degree (in this embodiment, for example, 6 degrees) with respect to the initial alignment direction ODIR on the alignment layers AL1 and AL2. In other words, an opening (slit) in the pixel electrode PIT is formed between two adjacent striped electrodes STE. A shape of the opening (slit) is rectangular which is comprised of long sides and short sides. The opening (slit) extends in an oblique direction with respect to the X-direction, which means that the long sides of the rectangular shape of the opening (slit) run obliquely to the X-direction. The opening (slit) has both ends closed by trunk electrodes TRE and is surrounded by the pixel electrode PIT.

In this manner, similar to FIG. 7B in the first embodiment, the liquid crystal molecules LCM in region II are rotated in a clockwise direction and the liquid crystal molecules LCM in region III are rotated in a counterclockwise direction. However, transmittance decreases in a neighborhood of a central line PIXC of the sub-pixel, because a rotation direction of the liquid crystal molecules LCM is reversed at the central line PIXC of the sub-pixel.

Because in each of region II and region III the liquid crystal molecules LCM are rotated in the same direction, transmittance in regions II and III is high. However, similar to the first embodiment, the response speed of the liquid crystal molecules LCM in regions II and III can be, for example, more than two times slower than that in the regions I and IV depending on the ambient temperature.

Figure 12:
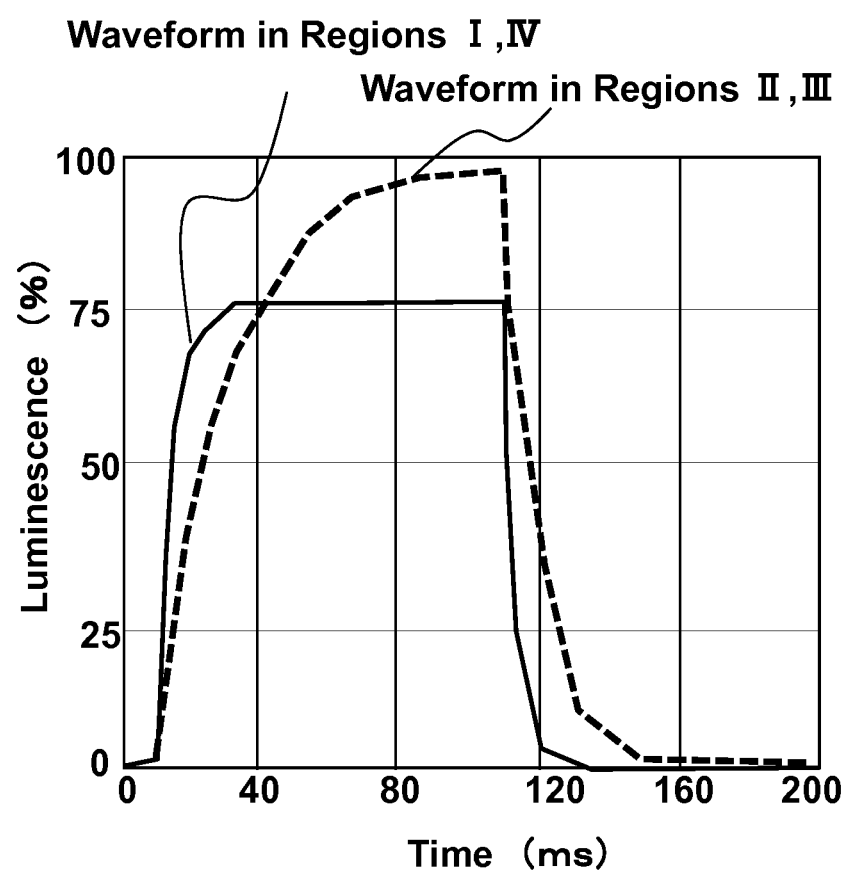
FIG. 12 is a diagram illustrating simulation results on electro-optic response of the liquid crystal display device according to the second embodiment at a temperature of −5° C.

An electro-optic response in regions I and IV of the sub-pixel can be driven, for example, three times faster than that in regions II and III shown in the sub-pixel of FIG. 11. On the other hand, transmittance in regions II and III is 30% higher than that in regions I and IV. In other words, a pixel structure in regions I and IV can display a moving image that has little blur even at a low temperature, because the pixel structure in regions I and IV can achieve a fast response speed of rotating the liquid crystal molecules LCM. In addition, the pixel structure in regions II and III can display a high luminescence image. As an example of the electro-optic response of regions I-IV, FIG. 12 shows simulation results of regions I-IV at an ambient temperature of −5° C.

When the ambient temperature is, for example, at or above 0° C., a response speed of the liquid crystal molecules LCM in regions II and III can become fast enough to neglect a difference in the response speed between regions I and IV and regions II and III. In regions II and III, blurred moving pictures due to a slow response speed of rotating the liquid crystal molecules LCM are unlikely to be noticeable at an ambient temperature at or above, for example, 0° C., in spite of the difference in response speed between the regions I and IV and the regions II and III. Therefore, high quality moving pictures can be displayed in the whole sub-pixel illustrated in FIG. 11.

In the second embodiment, the liquid crystal display LCD can display a moving image with little blurring at a low temperature, and can display a high luminescence image with little power consumption at a temperature equal to or higher than a predetermined temperature. To accomplish this, the ambient temperature is detected by the temperature detecting sensor circuit ATS illustrated in FIG. 1. Regardless of the detected ambient temperature, the timing control circuit TCON performs control such that the thin film transistor TFTL is turned on and a voltage based on an image signal is supplied to the pixel electrode PIT formed in regions I and IV from the first data line DLL. In regions I and IV, the liquid crystal molecules LCM are quickly rotated and a high quality image is displayed.

Further, when the ambient temperature detected by the temperature detecting sensor circuit ATS is lower than a predetermined temperature, the timing control circuit TCON performs control such that the thin film transistor TFTR is turned on and a voltage of a common electric potential is supplied to the pixel electrode PIT formed in regions II and III from the second data line DLR. In other words, a voltage for forming an electric field between the pixel electrode PIT and the common electrode CIT is not applied to pixel electrode PIT in regions II and III when the ambient temperature is lower than the predetermined temperature. In this manner, the liquid crystal molecules LCM in regions II and III are rotated little, and do not contribute to a displayed image. In addition, the timing control circuit TCON can control the backlight unit BL to increase a current value to prevent a decline in luminescence.

On the other hand, when the ambient temperature detected by the temperature detecting sensor circuit ATS is at or higher than the predetermined temperature, the timing control circuit TCON performs control such that the thin film transistor TFTR is turned on and a voltage based on an image signal is supplied to the pixel electrode PIT formed in regions II and III from the second data line DLR. In this manner, the liquid crystal molecules LCM in regions II and III are driven and display an image. In addition, the timing control circuit TCON can control the backlight unit BL to decrease a current value and can provide a high luminescence image and low power consumption.

It is noted that, in the second embodiment, the predetermined temperature can be any temperature below which the difference between the response speed of the liquid crystal molecules LCM in regions II and III and the response speed of the liquid crystal molecules LCM in the regions I and IV is noticeable. For example, the predetermined temperature could be 0° C. to −10° C.

It is also noted that the present disclosure is not limited to the first and second embodiments described above, and the configurations of the first and second embodiments can be modified as long as such a modification has the same effect and can achieve the same object.

What is claimed is:

1. A liquid crystal display device comprising:
   a first substrate;
   a second substrate;
   a liquid crystal layer interposed between the first and second substrates, wherein the first substrate, the second substrate and the liquid crystal layer form a plurality of pixels arranged in a matrix, each of the plurality of pixels including a plurality of sub-pixels;
   a lower electrode formed in the first substrate;
   a plurality of upper electrodes opposed to the lower electrode and formed between the lower electrode and the liquid crystal layer;
   a plurality of thin film transistors each connecting to one of the plurality of upper electrodes; and
   a temperature sensor that detects an ambient temperature, wherein
   at least one first upper electrode and at least one second upper electrode of the plurality of upper electrodes are formed in each of the plurality of pixels,
   each of the first upper electrodes has a plurality of slits that extend in a first direction,
   each of the second upper electrodes has a plurality of slits that extend in a second direction which is different from the first direction,
   the first and second upper electrodes are electrically isolated from each other,
   when the detected ambient temperature is equal to or higher than a predetermined temperature, data voltages based on an input signal are supplied to the first and second upper electrodes, and
   when the detected ambient temperature is lower than the predetermined temperature, data voltages based on the input signal are supplied to the first upper electrodes and a predetermined voltage irrespective of the input signal is supplied to the second upper electrodes.

2. The liquid crystal display device according to claim 1, wherein the slits of each of the first upper electrodes are open-ended at one end and the slits of each of the second upper electrodes are surrounded by the respective second upper electrode.

3. The liquid crystal display device according to claim 1, wherein the lower electrode is a common electrode and the plurality of upper electrodes are pixel electrodes.

4. The liquid crystal display device according to claim 1, wherein the liquid crystal layer includes liquid crystals having a positive dielectric constant anisotropy, and the first direction is substantially a same direction as an initial alignment direction of the liquid crystals.

5. The liquid crystal display device according to claim 1, wherein the liquid crystal layer includes liquid crystals having a positive dielectric constant anisotropy, and the first direction has an angle within 1 degree with respect to an initial alignment direction of the liquid crystals.

6. The liquid crystal display device according to claim 4, wherein the second direction has oblique angle with respect to the initial alignment direction.

7. The liquid crystal display device according to claim 5, wherein the second direction has an angle of greater than 1 degree and smaller than 45 degrees with respect to the initial alignment direction.

8. The liquid crystal display device according to claim 1, wherein each of the plurality of sub-pixels includes only one of the thin film transistors.

9. The liquid crystal display device according to claim 1, wherein
   each of the plurality of sub-pixels includes a first thin film transistor of the plurality of thin film transistors, a second thin film transistor of the plurality of thin film transistors, one of the first upper electrodes and one of the second upper electrodes, and
   the first transistor connects to the first upper electrode, and the second transistor connects to the second upper electrode.

10. The liquid crystal display device according to claim 2, further comprising a plurality of color filters each formed in one of the plurality of sub-pixels of each of the plurality of pixels, wherein
    each of the plurality of sub-pixels includes only one of the plurality of thin film transistors,
    a color of the plurality of color filters formed in each of the plurality of sub-pixels in each of the plurality of pixels is different from each other,
    the plurality of sub-pixels in each of the plurality of pixels includes a first sub-pixel and a second sub-pixel, the color filter of the first sub-pixel being a colored color filter and the color filter of the second sub-pixel being a non-colored color filter, and
    the first upper electrode is formed in the first sub-pixel and the second upper electrode is formed in the second sub-pixel of each of the plurality of pixels.

11. The liquid crystal display device according to claim 1, wherein the lower electrode is formed over the plurality of pixels.

12. The liquid crystal display device according to claim 1, further comprising a backlight unit,
    wherein luminescence of the backlight unit is brighter when the detected ambient temperature is lower than the predetermined temperature than when the detected ambient temperature is equal to or higher than the predetermined temperature.

13. A liquid crystal display device comprising:
    a first substrate;
    a second substrate; and
    a liquid crystal layer interposed between the first and second substrates, wherein the first substrate, the second substrate and the liquid crystal layer form a plurality of pixels arranged in a matrix, each of the pixels including at least a white sub-pixel having a non-colored color filter and a non-white sub-pixel having a colored color filter, a common electrode formed in the first substrate;

a plurality of pixel electrodes including first pixel electrodes and second pixel electrodes opposed to the common electrode and formed between the common electrode and the liquid crystal layer; and a temperature sensor that detects an ambient temperature, wherein the second pixel electrodes are located in the white sub-pixels and have a plurality of slits that extend in a first direction, the first pixel electrodes are located in the non-white sub-pixels and have a plurality of slits that extend in a second direction which is different than the first direction, the slits of each of the first pixel electrodes are open-ended at one end, and the slits of each of the second pixel electrodes are surrounded by the respective second pixel electrode, when the detected ambient temperature is equal to or higher than a predetermined temperature, the white sub-pixels and the non-white sub-pixels display an image based on an input signal, and when the detected ambient temperature is lower than the predetermined temperature, the non-white sub-pixels display an image based on the input signal and the white sub-pixels display a predetermined image irrespective of the input signal.

14. The liquid crystal display device according to the claim 13, wherein the liquid crystal layer includes liquid crystals having a positive dielectric constant anisotropy, the slits of the first pixel electrodes extend in a substantially same direction as an initial alignment direction of the liquid crystals, and the slits of the second pixel electrodes extend at an oblique angle with respect to the initial alignment direction.

15. The liquid crystal display device according to claim 13, further comprising a backlight unit, wherein luminescence of the backlight unit is brighter when the detected ambient temperature is lower than the predetermined temperature than when the detected ambient temperature is equal to or higher than the predetermined temperature.

\* \* \* \* \*